(12) United States Patent
Benyamin et al.

(10) Patent No.: US 11,711,224 B2
(45) Date of Patent: Jul. 25, 2023

(54) ETHERNET TRANSCEIVER TO RECEIVE A NON-DATA SIGNAL ENCODED WITH A CONTROL SIGNAL DURING A LOW-POWER MODE OF OPERATION

(71) Applicant: Marvell Asia Pte, Ltd., Santa Clara, CA (US)

(72) Inventors: Saied Benyamin, Calabasas, CA (US); Seid Alireza Razavi Majomard, Belmont, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 68 days.

(21) Appl. No.: 17/223,843

(22) Filed: Apr. 6, 2021

(65) Prior Publication Data
US 2021/0328819 A1 Oct. 21, 2021

Related U.S. Application Data

(63) Continuation of application No. 16/162,751, filed on Oct. 17, 2018, now Pat. No. 10,972,293.

(51) Int. Cl.
| H04L 12/10 | (2006.01) |
| H04L 12/40 | (2006.01) |
| H04L 49/351 | (2022.01) |
| H04B 17/336 | (2015.01) |
| H04L 12/12 | (2006.01) |

(52) U.S. Cl.
CPC .......... *H04L 12/10* (2013.01); *H04B 17/336* (2015.01); *H04L 12/12* (2013.01); *H04L 12/40039* (2013.01); *H04L 49/352* (2013.01)

(58) Field of Classification Search
CPC ... H04L 12/10; H04L 12/12; H04L 12/40039; H04L 49/352; H04L 49/351; H04L 49/358; Y02D 30/00; Y02D 30/50; Y02D 30/70
IPC .............. H04L 12/10,12/12, 12/40039, 49/352, 49/351, 49/358; Y02D 30/00, 30/50, 30/70
See application file for complete search history.

(56) References Cited

U.S. PATENT DOCUMENTS

| 10,794,710 B1 * | 10/2020 | Liu ...................... G06K 9/6288 |
| 2014/0010541 A1 * | 1/2014 | Diab ....................... H04L 12/12 398/66 |
| 2014/0229751 A1 * | 8/2014 | Manav .................. G06F 1/3278 713/323 |
| 2015/0163045 A1 * | 6/2015 | Chang ....................... H04L 5/16 370/296 |

* cited by examiner

*Primary Examiner* — Raymond N Phan

(57) ABSTRACT

An Ethernet transceiver is disclosed. The Ethernet transceiver includes transceiver circuitry having receiver circuitry to receive refresh signals during corresponding refresh cycles from a link partner during a low-power idle mode of operation. Each refresh signal has a refresh period, and where a quiet period is interposed between successive refresh cycles. Signal quality detection circuitry, during the low-power idle mode, determines a measure of signal quality associated with the received refresh signals. Subsequent refresh cycles exhibit at least one of an adjusted refresh period or an adjusted quiet period based on the measure of signal quality.

20 Claims, 4 Drawing Sheets

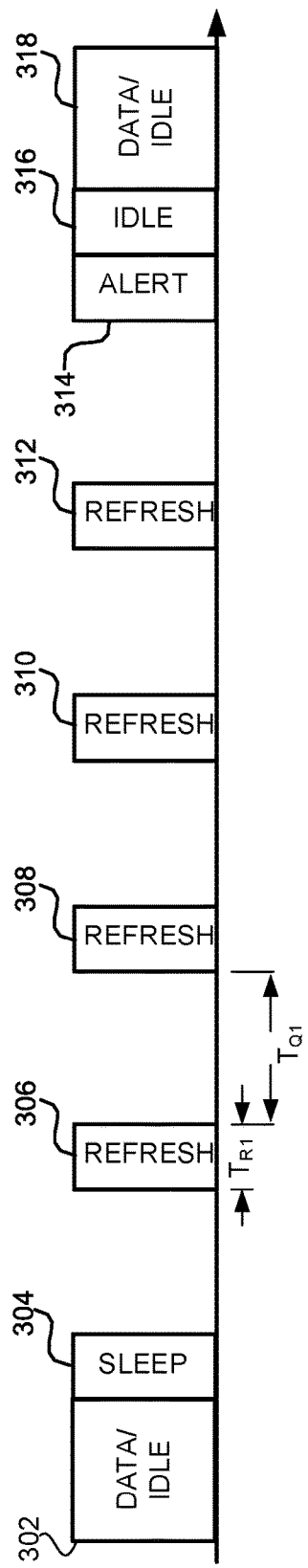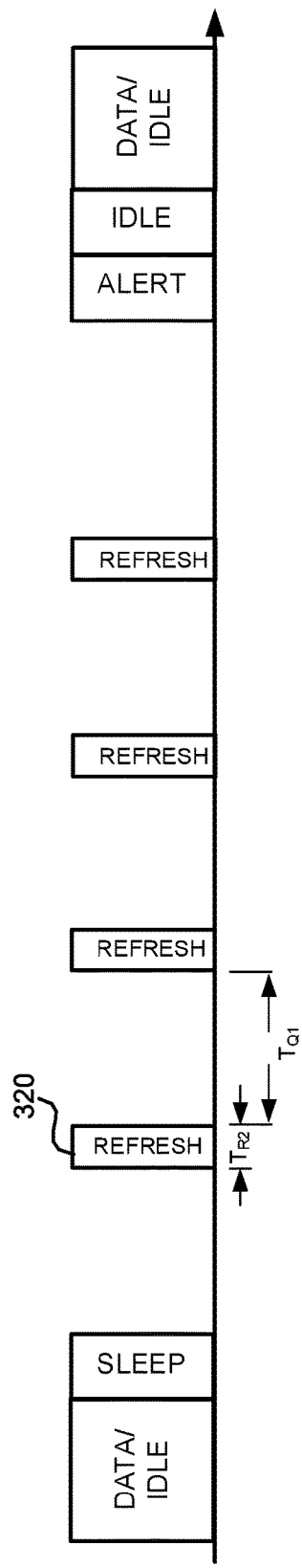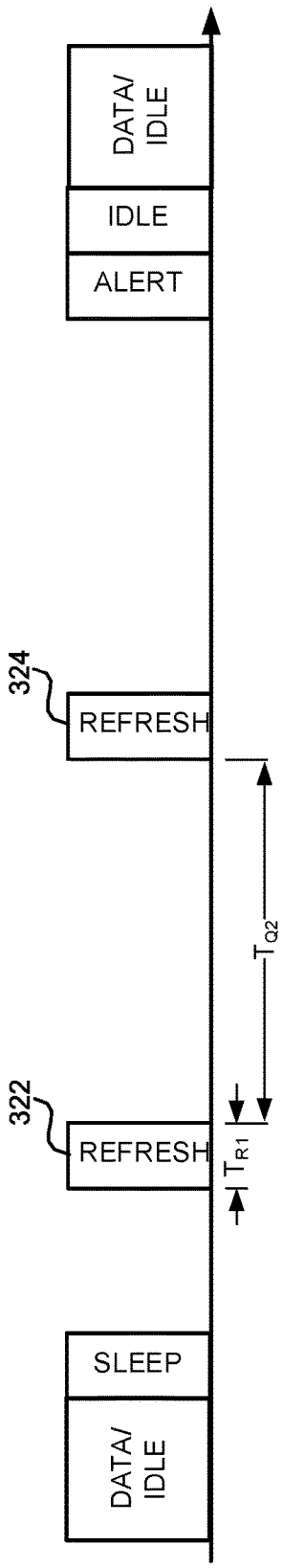

ETHERNET TRANSCEIVER TO RECEIVE A NON-DATA SIGNAL ENCODED WITH A CONTROL SIGNAL DURING A LOW-POWER MODE OF OPERATION

RELATED APPLICATIONS

This application is a Continuation of U.S. patent application Ser. No. 16/162,751, filed Oct. 17, 2018, entitled ADAPTIVE ENERGY EFFICIENT ETHERNET, which is expressly incorporated by reference herein.

TECHNICAL FIELD

The disclosure herein relates to communications systems, and more specifically to high-speed Ethernet systems and methods.

BACKGROUND

High-speed Ethernet standards, such as 10GBASE-T and NBASE-T, generally utilize four wired physical channels with the ability to achieve aggregated data rates from 1 Gbps up to 10 Gbps. The links are often bursty, where data transfers typically occur during a small portion of the time that the links are active. The transceiver circuitry, however, consumes power at all times while the links are active.

To minimize power consumption during periods of no data transfer, a low power mode of operation, commonly referred to as Energy Efficient Ethernet (EEE), has now been standardized. The low-power mode involves periodically transmitting refresh symbols between link partners to keep the link "active." The refresh symbols generally allow each link partner to update its filter coefficients and timing information to maintain synchronization with the other link partner.

While beneficial for its intended applications, the EEE low-power mode for 10GBASE-T Ethernet transceivers specifies fixed refresh periods and fixed quiet periods regardless of the signaling environment associated with the link. This may result in significant inefficiencies for the link while operating in the low-power idle mode.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 3A illustrates various transferred signals across a data link between master and slave devices during a legacy low-power mode of operation.

FIG. 3B illustrates an improved low-power mode of operation that adaptively adjusts a quiet period based on signal quality.

FIG. 3C illustrates the improved low-power mode of operation, similar to FIG. 3B, but involving adaptively adjusting a refresh pulse width based on signal quality.

DETAILED DESCRIPTION

Methods and apparatus for Ethernet network, transceivers and links are disclosed. In one embodiment, an Ethernet transceiver is disclosed. The Ethernet transceiver includes transceiver circuitry having receiver circuitry to receive refresh signals during corresponding refresh cycles from a link partner during a low-power idle mode of operation. Each refresh signal has a refresh period, and where a quiet period is interposed between successive refresh cycles. Signal quality detection circuitry, during the low-power idle mode, determines a measure of signal quality associated with the received refresh signals. Subsequent refresh cycles exhibit at least one of an adjusted refresh period or an adjusted quiet period based on the measure of signal quality.

In another embodiment, an Ethernet network is disclosed. The Ethernet network includes a network hub including multiple Ethernet ports, and multiple network devices coupled to the multiple Ethernet ports via multiple Ethernet data links. Each of the multiple Ethernet data links includes an upstream path for transferring data from the network hub to a given network device, and a downstream path for transferring data from the given network device to the network hub. Each of the Ethernet data links is configurable to operate in a low-power idle mode of operation to transfer refresh signals along each link, each refresh signal having a refresh period, and where a quiet period is interposed between successive refresh cycles. Each link includes signal quality detection circuitry to, during the low-power idle mode, determine a measure of signal quality associated with the refresh signals. Subsequent refresh cycles exhibit at least one of an adjusted refresh period or an adjusted quiet period based on the measure of signal quality.

Figure 1:
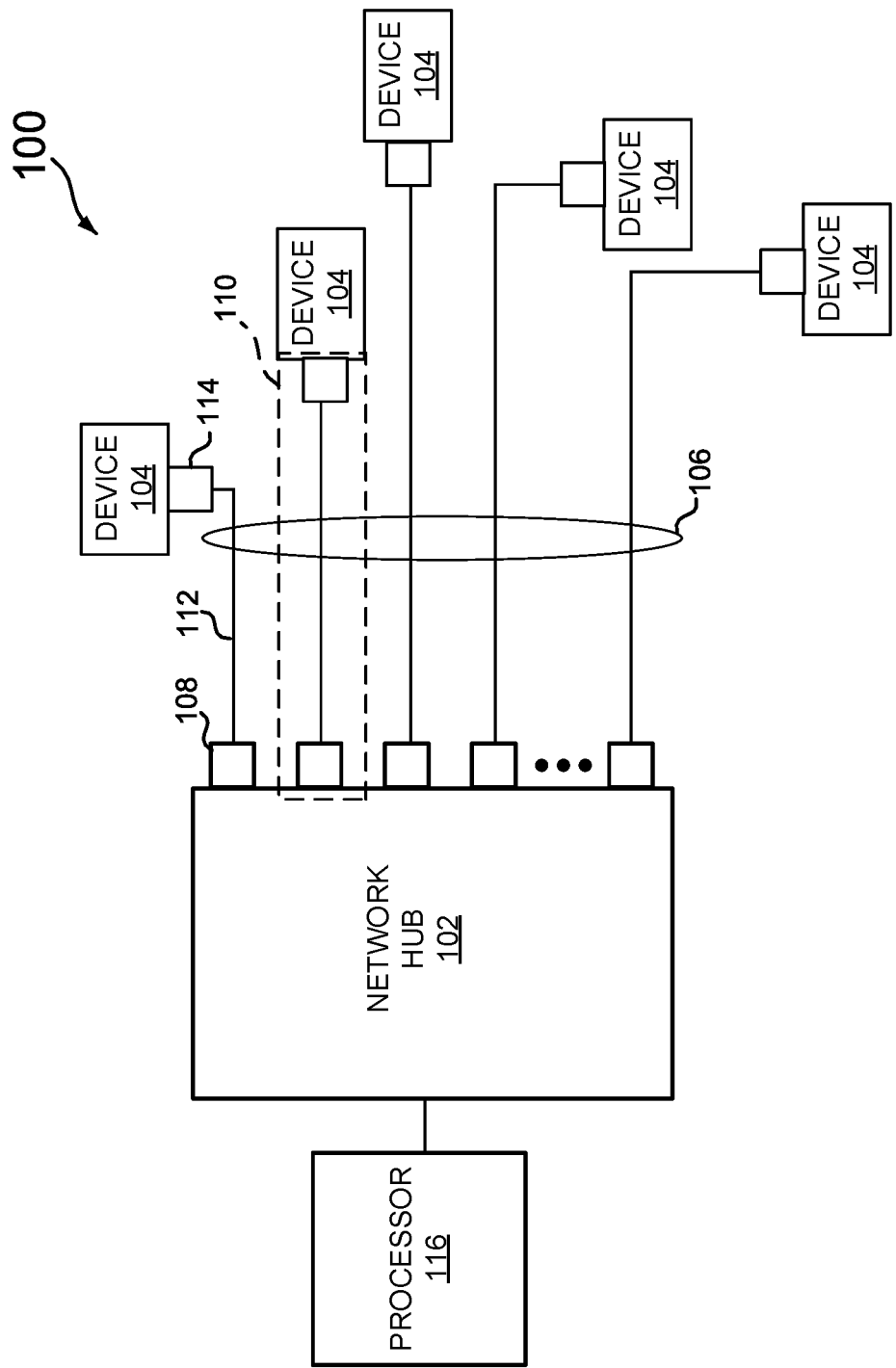
FIG. 1 illustrates one embodiment of an Ethernet network.

Referring now to FIG. 1, one embodiment for a high-speed Ethernet network, generally designated 100, includes a network hub 102 that interfaces with multiple network devices 104, via internally-routed wired signaling media 106. For one embodiment, the entire system is self-contained within a fixed framework, such as a body of a motor vehicle, aircraft or boat.

Further referring to FIG. 1, the network hub 102 may take the form of a network switch or router to direct traffic between various network nodes defined by the network devices 104. The network hub 102 may include, for example, forty-eight ports 108 to support an equal number of data links 110. Each port 108 connects to a local end of an Ethernet cable 112. A remote end of each cable 112 connects to a network device port 114, connected to, for example, a sensor, video camera or telematics data monitoring device. For one embodiment, each network device 104 generates data associated with, for example, imaging information from a certain angle of a right-front fender area of an automobile. Multiple nodes or network devices 104 may thus feed parameter data to the network hub 102, which may then direct the data to, for example, one or more processors 116 to evaluate the data and provide command and control signals to, for example, an autonomous driving system.

Figure 2:
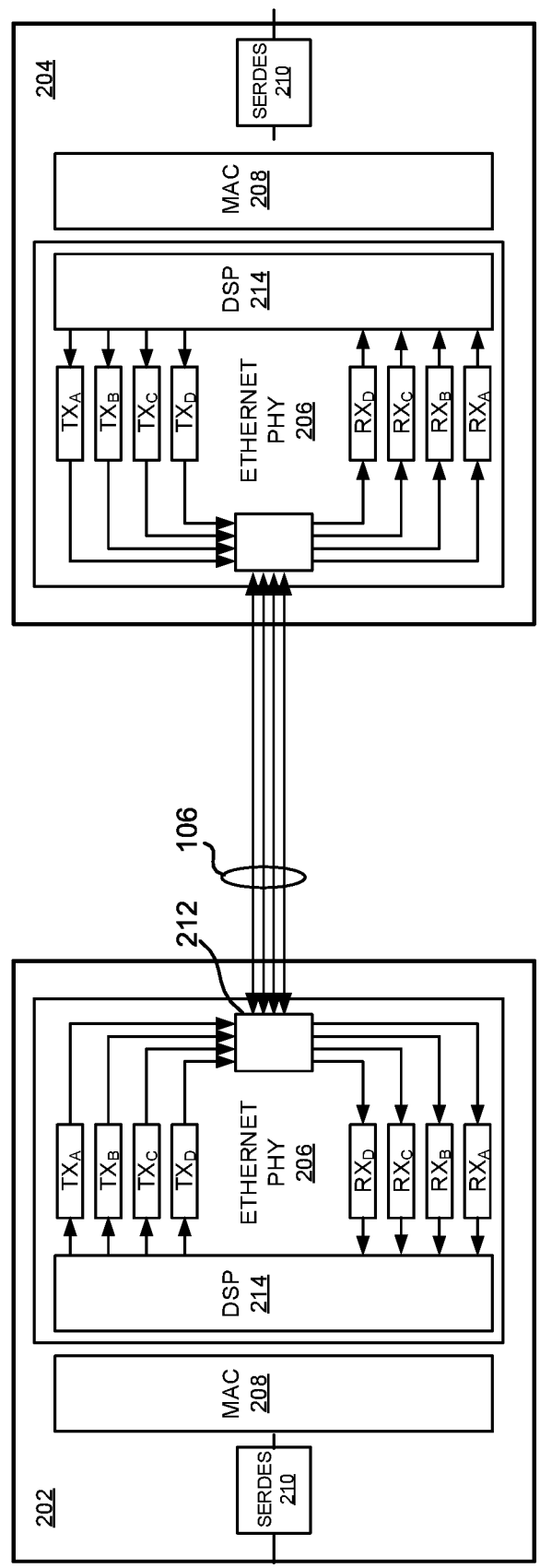
FIG. 2 illustrates one embodiment of a bidirectional Ethernet channel employed in the Ethernet network of FIG. 1.

FIG. 2 illustrates one embodiment of a data link 110 used in the network of FIG. 1. Each of the data links 110 includes a local Ethernet transceiver 202 and a remote transceiver 204. The local transceiver 202 is disposed in one of the ports 108 of the network hub 102, while the remote transceiver is disposed on a network device 104. For purposes of brevity, only the local transceiver circuitry will be described, with the understanding that the remote transceiver circuitry is similarly formed.

Further referring to FIG. 2, for one embodiment, the local transceiver 202 comprises a 10GBASE-T integrated circuit chip that incorporates a physical circuit (PHY) 206, a media access controller (MAC) 208, and a serializer/deserializer (SERDES) interface 210. The PHY 206 incorporates an analog front-end that employs four input/output (I/O) driver/receiver circuits $TX_A/RX_A$, $TX_B/RX_B$, $TX_C/RX_C$ and $TX_D/RX_D$ to transceiver data over four physical channels in accordance with a 10GBASE-T protocol. The transceiver I/O circuits interface with the Ethernet cable media 106 via a connector interface, at 212. The PHY 206 includes digital signal processing (DSP) logic 214 that provides interference cancellation functionality in response to noise and interference thresholds based on signaling media. The MAC circuit 124 interfaces the PHY 102 with a SERDES circuit 128. While most of the discussion herein emphasizes use of a 10GBASE-T transceiver integrated circuit (IC) chip, NBASE-T transceiver IC chips that offer variable data rates between 1 Gbps up to 25 Gbps may also be employed.

In some embodiments, the local and remote transceivers 202 and 204 may be configurable as "master" and "slave" devices. When configured as a "master" device, a transceiver provides a timing signal embedded in data transfers to the slave, such that the link maintains timing synchronization. Since the reference timing signal originates with the "master", no clock-data recovery (CDR) operations are required at the receive circuitry of the "master" device. A "slave" device, on the other hand, has its CDR circuitry enabled to receive data from the "master" and extract timing information from the data.

In some applications, data transfers along the links of FIGS. 1 and 2 may involve significant amounts of data from a given network device to the network hub (referred to herein as a downstream path), while little to no data may transfer from the network hub to the network device (referred to herein as an upstream path). An example of such a link might involve a video camera that generates image data for transfer along the downstream path, while occasionally receiving control and/or command information from the network hub along the upstream path.

In an effort to minimize power consumption, in one embodiment the link is configurable to operate in a low-power idle mode of operation that provides an adaptive feature on top of the legacy EEE mode with fixed refresh and quiet periods. A minimum feature set for the low-power idle mode corresponds to the currently standardized Energy Efficient Ethernet (EEE) low-power idle mode of operation, consistent with the standardized EEE mode in Institute of Electrical and Electronics Engineers (IEEE) 802.3az. FIG. 3A illustrates a timing diagram showing symbols transmitted over time via the data links described above consistent with the legacy EEE low-power idle mode. A given link enters the mode by ending a data transfer with an idle symbol, at 302. A "sleep" symbol is immediately sent to place the link in a low-power state, at 304. Periodic refresh symbols, such as at 306, 308, 310 and 312 are sent along the link to maintain timing synchronization. The refresh symbols allow the link partner to update its filters using adaptive algorithms while the link is in its low-power state. The first low-power mode in this EEE state enables for a fast return to active link status when ready. The link wakes up through use of an alert signal, at 314, followed by a wake symbol or series of idles, at 316. The alert signal allows detection without propagating data through the DSP of the receive channel. An idle symbol may then be provided, at 318, and then true data. Since filter updates were periodically carried out while the link was "inactive", the link does not need any training and may be brought up from the low-power state into a fully-operational state.

The minimum feature set for the low-power idle mode described above generates default refresh signals having predetermined fixed refresh periods $T_{R1}$ and correspondingly fixed quiet periods $T_{Q1}$. Due to the fixed nature of the refresh signals, a link having superior signal quality characteristics may not optimally save as much power as it could in the low-power idle mode. Similarly, in noisy environments, the link may struggle to maintain operation with the fixed settings in the low-power idle mode due to excessive noise.

To achieve optimized power savings for the Ethernet links, a modified low-power idle mode of operation may employed to achieve even further power reductions, as more fully explained below.

Referring now to FIGS. 3B and 3C, a modified low-power mode of operation generally provides an adaptive refresh feature to adjust at least one of the refresh period $T_R$ or the quiet period $T_Q$ based on a measured signal quality parameter. FIG. 3B illustrates a scenario involving an adaptive adjustment to refresh pulse widths, or refresh periods, $T_{R2}$, such as at 320. As the receiver detects a relatively high-quality received signal, the refresh pulse width may be made narrower such that the current used to generate the pulse from the transmit side of the link may be reduced, thereby reducing power consumption. FIG. 3C illustrates a similar concept, although in the context of adaptively adjusting a quiet period $T_{Q2}$, such as between refresh symbols 322 and 324. Maximizing the quiet period reduces the number of refresh symbols, thereby reducing power consumption. Of course, a combination of adjustments to the refresh pulse widths and quiet periods may also be carried out. Additionally, in circumstances where the link may be placed in a noisy environment, the adaptive adjustments may involve increasing the pulse width and/or reducing the quiet period in order to maintain the link in a successfully operating low-power state. Other parameter adjustments affecting the shape and/or timing associated with the refresh symbols may also or alternatively be made, such as varying amplitude, ramp rate, pulse shape and so forth.

For some embodiments, the signal quality parameter may be associated with refresh signals received over the link, and may involve signal-to-noise ratio (SNR), bit-error-rate (BER), or any decoding error value. Since the link is bidirectional, information indicating the measured signal quality may be periodically or continuously fed back to the transmit end of the link. For one embodiment, the signal quality indicator may be encoded in a control signal consistent with an Operations Administration and Monitoring (OAM) protocol. In this way, a given link may have its refresh signaling at the transmit end of the link adjusted to minimize power up to the point where the link can no longer operate successfully in the low-power mode.

Figure 4:
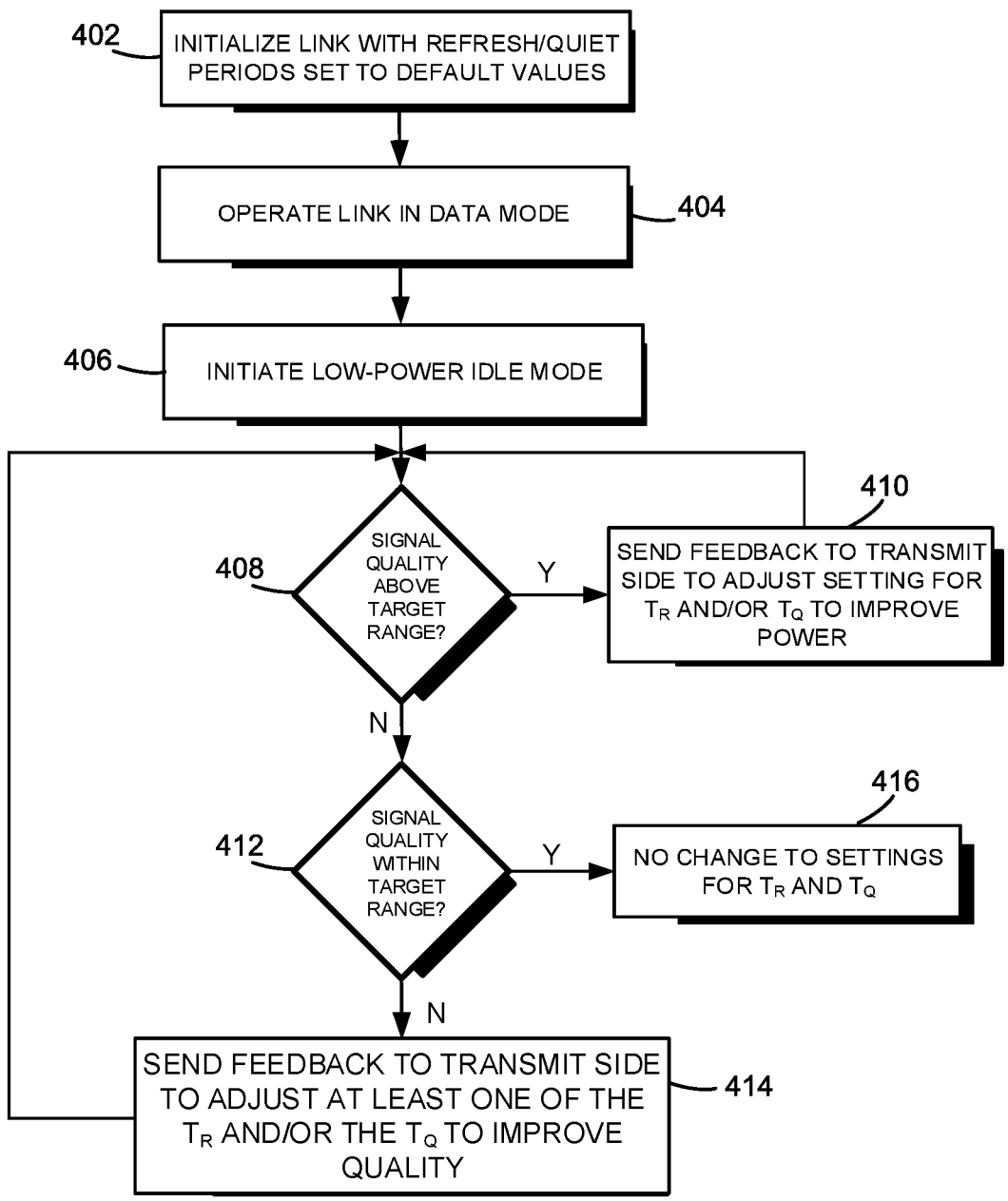
FIG. 4 illustrates one embodiment of steps in a method of operating an Ethernet transceiver device.

FIG. 4 illustrates a flowchart of steps consistent with the description above in the context of a local Ethernet transceiver device operating in the adaptive low-power mode of operation. Prior to actually entering into the low-power mode of operation, the link is initialized, at 402, such that the low-power mode of operation employs refresh and quiet signal periods $T_R$ and $T_Q$ that are set to default values. At 406, the local transceiver transmit circuitry initiates operation in the low-power mode by generating and transmitting a "sleep" control signal along the link to a remote link partner transceiver. The initiating may be triggered by any of several different events, including for example a consistently low data rate associated with the upstream path. The remote transceiver transmitter circuitry then begins to generate and transmit refresh signals having a predetermined refresh period and separated by a predetermined quiet period. The default refresh symbols are received by the local transceiver receiver circuitry, and evaluated for a measure of signal quality, at 408. If the singal quality measurement is above a target range, then a control signal is sent back to the remote transceiver on the transit side of the link, at 410, to adjust at least one of the refresh period $T_R$ or to the quiet period $T_Q$ to improve power. Refresh signals in accordance with the adjusted parameter(s) are then transmitted and evaluated in an iterative fashion.

If the measured signal quality is not above the target range, then a determination is carried out at 412 to evaluate whether the quality is within range. If within range, then no change to the setting occurs at 416. If the signal quality is not within the range (thus below the range), then feedback is sent back to the transmit side transceiver, at 414, to adjust at least one of the refresh period $T_R$ or the quiet period $T_Q$ to improve signal quality.

At some point, the iterative steps of FIG. 4 may result in the signal quality measurement identifying an unacceptable level. At that point, the remote transceiver restores a previous "acceptable" setting for the refresh period and/or the quiet period, at 410, to restore the link to one capable of transferring data/refresh symbols without undue errors.

The network architecture described above lends itself well to autonomous driving applications where bursty data rates upwards of 8 Gbps to 10 Gbps may be necessary in an effort to evaluate vast swaths of data generated by numerous video cameras and sensors. By incorporating a 10GBASE-T Ethernet network within an autonomous driving system, proven high-speed communications within an automotive environment may be realized. Additionally, by altering the 10GBASE-T communications channels to support an adaptive low-power mode, significant power savings may be realized.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. An Ethernet transceiver, comprising:
   interface circuitry configured to interface with a link partner transceiver via at least one physical channel;
   receiver circuitry coupled to the interface circuitry,
      wherein the receiver circuitry is configured, in a data mode of operation, to receive data signals from the link partner transceiver,
      wherein the receiver circuitry is configured, in a low-power mode of operation, to receive non-data signals from the link partner transceiver over the at least one physical channel, ones of the non-data signals encoded with an Operations Administration and Monitoring (OAM) control signal; and
   processing circuitry, responsive to the ones of the non-data signals received during the low-power mode of operation, configured to perform a processing operation without entering the data mode of operation.

2. The Ethernet transceiver according to claim 1, wherein the receiver circuitry further comprises:

circuitry configured to receive, in the low-power mode of operation, the ones of the non-data signals with refresh signals that are transmitted from the link partner transceiver in the second direction over the at least one physical channel, the circuitry configured to maintain synchronization between the Ethernet transceiver and the link partner transceiver based at least in part on the received refresh signals.

3. The Ethernet transceiver according to claim 1, wherein the receiver circuitry further comprises:
circuitry configured to decode a signal quality parameter from the ones of the non-data signals without entering the data mode of operation.

4. The Ethernet transceiver according to claim 1, wherein the circuitry, responsive to the ones of the non-data signals, configured to perform a processing operation comprises:
transmit circuitry configured to generate second refresh signals, without entering the data mode, in response to receiving the ones of the non-data signals.

5. The Ethernet transceiver according to claim 2, wherein the receiver circuitry further comprises:
circuitry configured to receive, in the low-power mode of operation, the ones of the non-data signals from the link partner transceiver periodically with the refresh signals, the circuitry to maintain synchronization between the Ethernet transceiver and the link partner transceiver based at least in part on the received refresh signals.

6. The Ethernet transceiver according to claim 2, wherein the receiver circuitry further comprises:
circuitry configured to receive, in the low-power mode of operation, the ones of the non-data signals from the link partner transceiver continuously with the refresh signals, the circuitry to maintain synchronization between the Ethernet transceiver and the link partner transceiver based at least in part on the received refresh signals.

7. The Ethernet transceiver according to claim 3, wherein the circuitry to decode the signal quality parameter comprises:
circuitry configured to extract from the ones of the non-data signals a parameter value indicative of one or more of a signal-to-noise ratio (SNR) and of a bit-error-rate (BER); and
wherein the circuitry, responsive to the ones of the non-data signals, configured to perform a processing operation comprises transmit circuitry configured to transmit information to the link partner transceiver representing the parameter value to adjust a refresh period or quiet period associated with the refresh signals.

8. An Ethernet network, comprising:
a network hub including multiple Ethernet ports;
multiple network devices coupled to the multiple Ethernet ports via multiple Ethernet data links;
wherein ones of the Ethernet data links are configurable to operate in one of two modes, including
a data mode of operation, to transfer data signals between a given Ethernet port and a given network device, and
a low-power mode of operation, to transfer non-data signals between the given Ethernet port and the given network device, ones of the non-data signals encoded with an Operations Administration and Monitoring (OAM) control signal; and
processing circuitry, responsive to the ones of the non-data signals received during the low-power mode of operation, configured to perform a processing operation without entering the data mode of operation.

9. The Ethernet network of claim 8, wherein the ones of the Ethernet data links further comprise:
circuitry configured to transfer, in the low-power mode of operation, the ones of the non-data signals with refresh signals to maintain synchronization between a given Ethernet port and a corresponding network device.

10. The Ethernet network of claim 8, wherein the ones of the Ethernet data links further comprise:
circuitry configured to decode a signal quality parameter from the ones of the non-data signals without entering the data mode of operation.

11. The Ethernet network of claim 8, wherein:
the multiple network devices comprise one or more of a sensor, a video camera or a telematics data monitoring device.

12. The Ethernet network of claim 9, wherein the ones of the Ethernet data links further comprise:
circuitry configured to transfer, in the low-power mode of operation, the ones of the non-data signals periodically with the refresh signals to maintain synchronization between a given Ethernet port and a corresponding network device.

13. The Ethernet network of claim 9, wherein the ones of the Ethernet data links further comprise:
circuitry configured to transfer, in the low-power mode of operation, the ones of the non-data signals continuously with the refresh signals to maintain synchronization between a given Ethernet port and a corresponding network device.

14. The Ethernet network of claim 10, wherein the circuitry configured to decode the signal quality parameter comprises:
circuitry configured to extract from the ones of the non-data signals a parameter value indicative of one or more of a signal-to-noise ratio (SNR) and of a bit-error-rate (BER); and
wherein the circuitry, responsive to the ones of the non-data signals, configured to perform a processing operation comprises transmit circuitry configured to transfer information between the given Ethernet port and the given network device representing the parameter value to adjust a refresh period or quiet period associated with the refresh signals.

15. The Ethernet network of claim 11, wherein:
the network hub and the multiple network devices are disposed within the body of a motor vehicle.

16. The Ethernet network of claim 15, wherein:
the multiple network devices generate data for use in an autonomous driving system.

17. An Ethernet link, comprising:
a first Ethernet transceiver;
a second Ethernet transceiver coupled to the first Ethernet transceiver via at least one physical channel;
wherein the Ethernet link is configurable to operate in one of two modes, including
a data mode of operation, to transfer data signals between the first Ethernet transceiver and the second Ethernet transceiver, and
a low-power mode of operation, to transfer non-data signals between the first Ethernet transceiver and the second Ethernet transceiver, ones of the non-data signals encoded with an Operations Administration and Monitoring (OAM) control signal; and
processing circuitry, responsive to the ones of the non-data signals received during the low-power mode of operation, configured to perform a processing operation without entering the data mode of operation.

18. The Ethernet link of claim 17, further comprising:
 circuitry configured to transfer, in the low-power mode of operation, the non-data signals with refresh signals to maintain synchronization between the first Ethernet transceiver and the second Ethernet transceiver.

19. The Ethernet link of claim 17, further comprising:
 circuitry configured to decode a signal quality parameter from the ones of the non-data signals without entering the data mode of operation.

20. The Ethernet link of claim 19, wherein the circuitry to decode the signal quality parameter comprises:
 circuitry configured to extract from the ones of the non-data signals a parameter value indicative of one or more of a signal-to-noise ratio (SNR) and of a bit-error-rate (BER); and
 wherein the circuitry, responsive to the ones of the non-data signals, configured to perform a processing operation comprises transmit circuitry configured to transfer information between the first Ethernet transceiver and the second Ethernet transceiver representing the parameter value to adjust a refresh period or quiet period associated with the refresh signals.

* * * * *